United States Patent

Akiwa et al.

[11] Patent Number: 6,143,200
[45] Date of Patent: Nov. 7, 2000

[54] RARE EARTH OXYSULFIDE PHOSPHOR AND X-RAY DETECTOR USING THE SAME

[75] Inventors: Takeshi Akiwa; Yuji Aoki, both of Odawara; Etsuo Shimizu, Nakano; Hideo Suzuki, Odawara, all of Japan

[73] Assignee: Kasei Optonix, Ltd., Tokyo, Japan

[21] Appl. No.: 09/202,235

[22] PCT Filed: Jun. 20, 1997

[86] PCT No.: PCT/JP97/02119

§ 371 Date: Dec. 10, 1998

§ 102(e) Date: Dec. 10, 1998

[87] PCT Pub. No.: WO97/48781

PCT Pub. Date: Dec. 24, 1997

[30] Foreign Application Priority Data

Jun. 21, 1996 [JP] Japan ................................ 8-161931
May 22, 1997 [JP] Japan ................................ 9-131965

[51] Int. Cl.[7] .............................. C09K 11/84; G01T 1/20
[52] U.S. Cl. ................................ 252/301.45; 250/361 R
[58] Field of Search ..................... 252/301.45; 250/361 R

[56] References Cited

FOREIGN PATENT DOCUMENTS

| | | |
|---|---|---|
| 32 12 405 A1 | 10/1983 | Germany . |
| 3212405 | 10/1983 | Germany . |
| 57-139172 | 8/1982 | Japan . |
| B-60-4856 | 7/1985 | Japan . |
| 6-145655 | 5/1994 | Japan . |
| 8-60148 | 3/1996 | Japan . |
| 8-60149 | 3/1996 | Japan . |

OTHER PUBLICATIONS

Derwent Abstract for SU 497,326; 415176.

*Primary Examiner*—C. Melissa Koslow
*Attorney, Agent, or Firm*—Pitney, Hardin, Kipp & Szuch LLP

[57] ABSTRACT

When each of a rare earth oxysulfide phosphor represented by the composition formula (I) of $Ln_2 O_2 S:xRe, yM$ wherein Ln represents at least one rare earth element selected from Y, La and Gd; Re represents at least one rare earth element selected from Pr and Tb; M represents at least one element selected from Nb, Ta and Mn; and x and y are numbers which satisfy the conditions of $1\times10^{-4} \leq x \leq 0.2$ and $0.01$ ppm $\leq y \leq 1000$ ppm, respectively, and a rare earth oxysulfide phosphor represented by the composition formula (II) of $(Gd_{1-x-y-z}, Pr_x, Sc_y, Ce_z)_2 O_2 S$ wherein x, y and z are numbers which satisfy the conditions of $10^{-4} \leq x \leq 2\times10^{-1}$, $10^{-4} \leq y \leq 10^{-1}$ and $0 \leq z \leq 10^{-6}$, respectively is excited by radiation, each of them emits a scintillation at high efficiency, and decreases the afterglow. Each of the phosphors is used for an X-ray detector as a scintillator, and is useful for an X-ray CT apparatus.

7 Claims, 2 Drawing Sheets

RARE EARTH OXYSULFIDE PHOSPHOR AND X-RAY DETECTOR USING THE SAME

TECHNICAL FIELD OF INVENTION

The present invention relates to a phosphor and an X-ray detector using the same, and particularly, to a rare earth oxysulfide phosphor, which emits a scintillation at high efficiency when the phosphor is excited by radiation such as X-rays or gamma rays, and whose afterglow is decreased; and an X-ray detector using the same, in which a signal/ noise ratio (S/N ratio) is improved.

BACKGROUND OF THE ART

Recently, an X-ray CT-apparatus has been broadly used in the field of medical diagnosis. For an X-ray detector in a conventional X-ray CT-apparatus, an ionization chamber which is filled with a high-pressure xenon gas has been, in general, used. However, a detector of this ionization-chamber type had such problems that the detector is large and heavy in itself; that an ionization current or a signal is not sufficiently large; that the absorption of X-rays is small; and that a residual ion current lies. Thus, with the X-ray detector of ionization-chamber type, due to these problems, it was difficult to develop an X-ray CT-apparatus of high performance having such characteristics that a signal/noise ratio (S/N ratio) is excellent, and diagnostic performance, spatial resolution and time resolution or high-speed scanning property are high.

Then, a solid-state X-ray detector in which a monocrystalline $Bi_4Ge_3O_{12}$ scintillator or a $CdWO_4$ phosphor is used, has been developed, and is partially used in practice. However, the solid-state X-ray detector using the $CdWO_4$ phosphor is smaller in a signal than a xenon-gas detector, and can not provide a sufficiently satisfactory S/N ratio. This shows a limitation in the intrinsic luminescence efficiency which is possessed by the $CdWO_4$ phosphor.

Accordingly, as a phosphor for the solid-state X-ray detector, it has been required to employ a phosphor which is rather larger in radiation absorbing performance than the $CdWO_4$ phosphor, and is high in conversion efficiency of from radiation into light, and is speedy in the response of luminescence to radiation, for example, a rare earth oxysulfide phosphor which is represented by $Gd_2O_2S{:}Pr$ or the like.

However, it has been clarified that this rare earth oxysulfide phosphor produces the phenomenon of a slightly long afterglow, that is, that a feeble luminescence is left even when 1/1000 to 1/100 seconds have been passed away after X-ray irradiation was cut off. Thereby, it has been clarified that the above-mentioned rare earth oxysulfide phosphor can not be employed for a certain radiation detector for an X-ray CT, in which an especially feeble afterglow is required, and a complicated detector-apparatus for removing the effect of the afterglow of luminescence from the phosphor is required, if the rare earth oxysulfide phosphor is employed. Thus, if a phosphor leaving a feeble afterglow could be obtained, the phosphor could be employed also for the above-mentioned radiation detector for an X-ray CT.

As countermeasures therefor, it has been proposed to use, for example, a rare earth oxysulfide phosphor such as $Gd_2O_2S{:}Pr$ phosphor to which Ce is added as disclosed in Japanese Patent KOKAI (Laid-Open) No.6-145655, and a phosphor to which a trace halogen element is added as disclosed in Japanese Patent publication No.60-4856 so as to shorten the time of afterglow.

According to experiments by the present inventors, it has been found that when Ce is added to the rare earth oxysulfide phosphor in a certain amount or more, the phosphor is colored into a yellowish color in itself, and the luminescence output thereof is decreased in itself. Therefore, it has been impossible to sufficiently exert the characteristics of the rare earth oxysulfide phosphor, and accordingly, and X-ray detector which is sufficiently satisfactory in the S/N ratio, and in turn an X-ray CT apparatus have not been provided, like the conventional X-ray detector as mentioned above.

DISCLOSURE OF THE INVENTION

The present invention has been found to solve the problems of the prior art as mentioned above. An object of the present invention is to provide a rare earth oxysulfide phosphor whose afterglow is remarkably decreased without deteriorating the characteristics of a high luminescence efficiency which are possessed by the rare earth oxysulfide phosphor.

Furthermore, it is another object of the present invention to provide an X-ray detector by which a high S/N ratio is stably obtained.

The present inventors have diligently studied to solve the above-mentioned objects. As a result, various additives were added to the conventional rare earth oxysulfide phosphors, and then the emission luminance and afterglow of the phosphors were determined. Consequently, it has been found that only when a specific impurity element is included in the phosphor in a specific amount, the above-mentioned objects are attained, and thus the present invention has been accomplished.

According to an aspect of the present invention, a rare earth oxysulfide phosphor is provided, which is represented by the composition formula (I):

$$Ln_2O_2S{:}xRe, yM \quad (I)$$

wherein Ln represents at least one rare earth element selected from Y, La and Gd; Re represents at least one rare earth element selected from Pr and Tb; M represents at least one element selected from Nb, Ta and Mn; and x and y are numbers which satisfy the conditions of $1 \times 10^{-4} \leq x \leq 0.2$ and $0.01 \text{ ppm} \leq y \leq 1000 \text{ ppm}$, respectively.

According to another aspect of the present invention, a rare earth oxysulfide phosphor is provided, which is characterized by being represented by the composition formula (II):

$$(Gd_{1-x-y-z}, Pr_x, SC_y, Ce_z)_2O_2S \quad (II)$$

wherein x, y and z are numbers which satisfy the conditions of $1 \times 10^{-4} \leq x \leq 2 \times 10^{-1}$, $10^{-4} \leq y \leq 10^{-1}$ and $0 \leq z \leq 10^{-6}$, respectively.

According to still another aspect of the present invention, an X-ray detector is provided, which is characterized by using the rare earth oxysulfide phosphor represented by the above-mentioned formula (I) or (II) as a scintillator.

BEST MODE OF EMBODIMENT OF THE INVENTION

Figure 1:
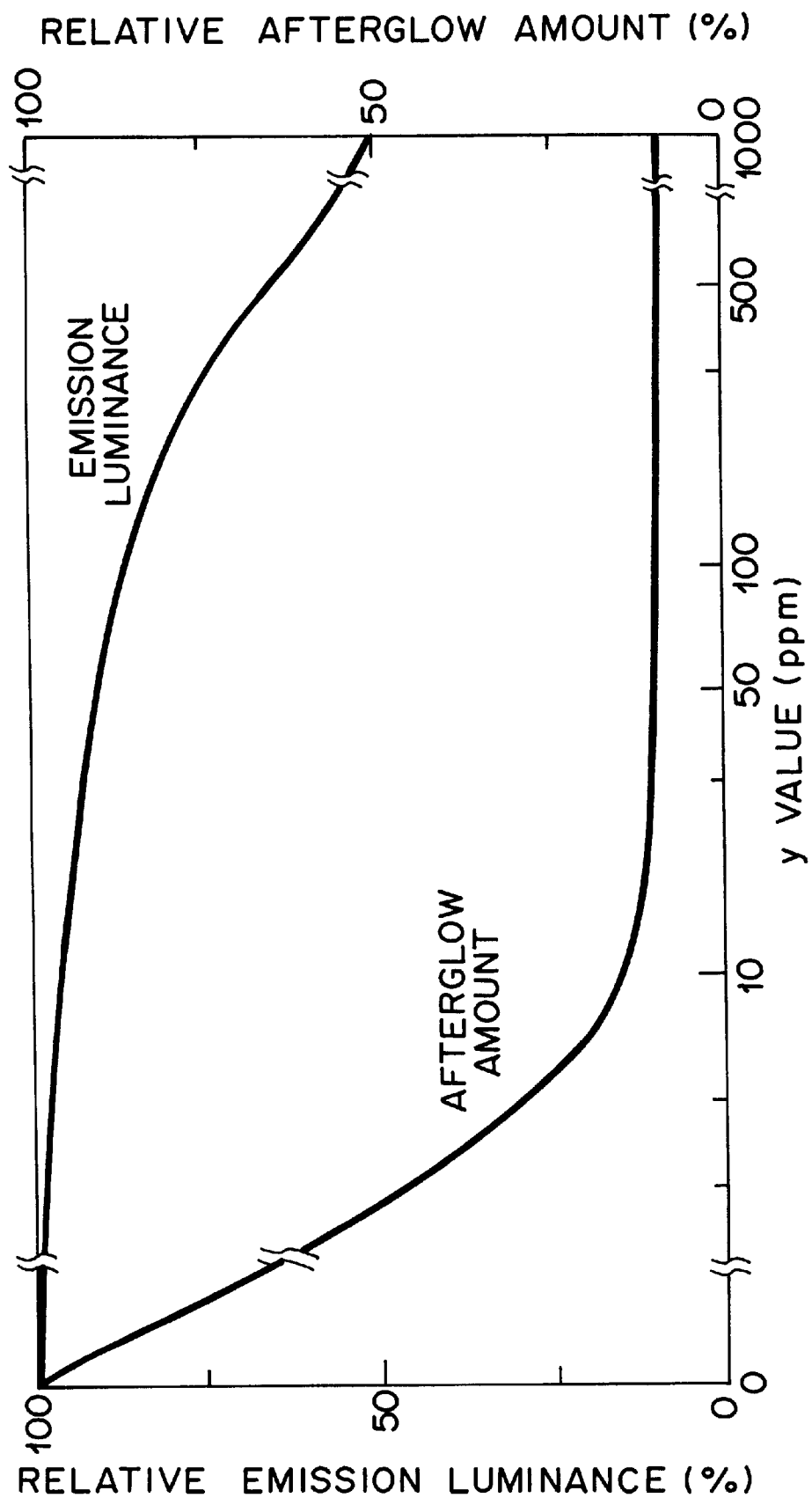
FIG. 1 is a graph showing the relation between the content of an additive (Nb) in a rare earth oxysulfide phosphor of Working Example 1 of the present invention and the emission luminance under an X-ray excitation of the phosphor and the amount of afterglow thereof.

Hereinafter, the present invention will be in more detail explained.

In order to prepare a rare earth oxysulfide phosphor having the above-mentioned composition formula (I), first, as a raw material compound for constituting the phosphor, the following compounds:

i) $Ln_2O_3$, or a Ln compound which is easily convertible into $Ln_2O_3$, at a high temperature;
ii) $Re_2O_3$, or a Re compound which is easily convertible into $Re_2O_3$ at a high temperature;
iii) an oxide of element "M", or a compound of the element "M" which is easily convertible into the oxide of the element "M" at a high temperature; and
iv) sulfur (S)

are weighed and picked out, respectively, at a stoichiometric ratio as shown by the composition formula (I):

$$Ln_2O_2S:xRe, yM$$

wherein Ln, Re, M, x and y are as mentioned above. Then, a flux is added thereto so as to homogeneously mix the same with the phosphor raw material compounds constituting the phosphor as mentioned above, and then a heat-resistant container such as an alumina crucible is filled with the mixture which is then fired in the air at a temperature of 900° C. to 1300° C. for a period of 1 to 10 hours. Then, the resulting fired product is sufficiently washed with a pure water so as to remove the flux and the like. Incidentally, the fired product may be washed with a diluted hydrochloric acid or the like. After washing, the fired product is dried and sieved so as to break the aggregation of the phosphor particles to make the rare earth oxysulfide phosphor.

With respect to phosphor raw material of compounds containing rare earth elements such as Ln and Re, among the above-mentioned phosphor raw materials, these raw materials can be preliminarily mixed with each other and then dissolved with an acid or the like. Thereafter, oxalic acid, ammonia and the like can be added thereto so as to coprecipitate the same as a mixed oxalate or hydroxide of these rare earth elements, and then the coprecipitated product can be fired to be pyrolized into oxides. Then, the oxides and the remaining other phosphor raw materials can be homogeneously mixed with each other, and thereafter can be finally fired. On the other hand, as a flux for converting the phosphor raw materials into oxysulfides, in addition to sulfur, a carbonate or phosphate of an alkaline metal, such as $Na_2CO_3$ and $K_3PO_4$ is used, whose amount to be added is preferably in the range of 20 to 50% by weight of the total weight of the phosphor raw materials for phosphor, while sulfur (S) as used as a phosphor raw material for phosphor is preferably used in a larger amount than the stoichiometric amount as above mentioned in order to protect each of phosphor raw materials from oxidation and furthermore in order to change a firing atmosphere into a sulfurizing property.

The concentration (namely, the value of "x" which is represented as a gram-atom number) of an activating agent (Re) for the rare earth oxysulfide phosphor is preferably in the ranges of $1\times10^{-4} \leq x \leq 0.2$ from the point of view of emission luminance, more preferably in the ranges of $5\times10^{-4} \leq x \leq 2\times10^{-2}$. On the other hand, if the content of an additive element "M" (namely, the value of "y") which is included to decrease the afterglow, which is represented as a ratio of the weight of the included element "M" to a total weight of the phosphor is smaller than 0.01 ppm, the effect of decreasing the afterglow is not provided. Therefore, an amount smaller than 0.01 ppm is not preferred. On the other hand, if the content is larger than 1000 ppm, although the afterglow is decreased, the emission luminance also is remarkably decreased. Therefore, an amount larger than 1000 ppm is not practically preferred.

Accordingly, the range of the value of "y" as mentioned above is preferably 0.01 ppm$\leq y \leq$1000 ppm, and more preferably 0.1 ppm$\leq y \leq$200 ppm. However, the range of the preferable content of the element "M" (namely, the value of "y") varies in the kind of the additive element "M" For example, when the element "M" is Nb, the value of "y" is preferably in the range of 10 to 1000 ppm, while when the element "M" is Ta, the value of "y" is preferably in the range of 0.5 to 20 ppm and while when the element "M" is Mn, the value of "y" is preferably in the range of from 0.1 to 5 ppm, so that the afterglow is further decreased, and a practical emission luminance is maintained.

FIG. 1 is a graph showing the correlation between the content (the value of "y") of Nb which is an additive agent and the emission luminance of the resulting phosphor or the amount of afterglow thereof in connection with a $Gd_2O_2S$: xPr, yNb phosphor in which the concentration (namely, the value of "x") of Pr as an activator is constant (0.001 ppm), the phosphor being an example of the rare earth oxysulfide phosphor of the present invention. In the FIG. 1, the emission luminance is an instantaneous emission luminance which was obtained by determining a photographic density of an X-ray film after developing the same when each of the phosphors was brought into contact with the X-ray film and was exposed to X-rays having a tube voltage of 100 kV at a dark place, while the amount of afterglow is an accumulated amount of afterglow, which was obtained from a photographic density after developing an X-ray film when each of the phosphors was separately kept in a dark place and was exposed to X-rays, and after one second interval from the turning off the X-rays, the phosphors was brought into contact with the X-ray film, and then the X-ray film was left as it was at a dark place for a period of thirty minutes. Incidentally, each of the measurements of each sample is represented as a relative value when the instantaneous emission luminance and amount of afterglow of a phosphor which does not include an additive agent (Nb) were considered as 100, respectively and the values of the emission luminance and amount of afterglow which are hereinafter shown in each of the working examples also were determined in the same manner.

As can be seen from FIG. 1, if the content (the value of "y") of an additive agent (Nb) is increased up to a certain extent or more, the afterglow from the phosphor is decreased, while the emission luminance also is decreased. Therefore, such a content is not preferred. On the contrary, if the content of Nb is too small, the afterglow is not effectively decreased. Thus, when the content (the value of "y") of an additive agent (Nb) is practically in the range of 10 ppm$\leq y \leq$1000 ppm, the afterglow is efficiently decreased, while the emission luminance is not so much decreased. It was confirmed that a similar tendency as mentioned above is shown even when the rare earth element constituting the phosphor is not Gd, but Y or La; even when the activator is not Pr, but Tb; and even when the element "M" of the additive agent is not Nb but, Ta or Mn. Incidentally, when at least one of impurity elements such as Ce, Ti and Zr is added to the phosphor of the present invention, the afterglow of the phosphor is further decreased.

Additionally, when the rare earth oxysulfide phosphor ($Ln_2O_2S$: xRe, yM) having the composition formula (I) is

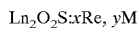

used as a phosphor layer for a radiation intensifying screen, a radiation intensifying screen which is high speed and low afterglow is provided, and in particular when Re in the above-mentioned formula is Tb, such a phosphor for a radiation intensifying screen is more preferable in speed.

A rare earth oxysulfide phosphor having the composition formula (II) can be prepared according to the same process as preparation of the rare earth oxysulfide phosphor having the composition formula (I). First, as a phosphor raw material compound, the following compounds:

i) $Gd_2O_3$, or a Gd compound which is easily convertible into $Gd_2O_3$ at a high temperature;
ii) $Pr_6O_{11}$, or a Pr compound which is easily convertible into $Pr_6O_{11}$ at a high temperature;
iii) $Sc_2O_3$, or a Sc compound which is easily convertible into $Sc_2O_3$ at a high temperature;
iv) $CeO_2$, or a Ce compound which is easily convertible into $CeO_2$ at a high temperature; and
v) sulfur (S) are weighed and picked out, respectively, at a stoichiometric ratio as shown by the composition formula (II):

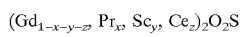

$$(Gd_{1-x-y-z}, Pr_x, Sc_y, Ce_z)_2O_2S$$

wherein x, y and z are as mentioned above. Then, a flux is added thereto so as to homogeneously mix the same with the phosphor raw material compounds as mentioned above, and then a heat-resistant container such as an alumina-crucible is filled with the mixture which is then fired in the air at a temperature of 900° C. to 1300° C. for a period of 1 to 10 hours. Then, the resulting fired product is sufficiently washed with a pure water so as to remove the flux and the like. Incidentally, the fired product may be washed with a diluted hydrochloric acid or the like. After washing, the fired product is dried and sieved so as to break the aggregation of the phosphor particles to make the rare earth oxysulfide phosphor of the present invention.

With respect to raw materials of compounds containing rare earth elements such as Gd, Pr, Sc and Ce among the above-mentioned phosphor raw materials, these raw materials are previously dissolved with an acid or the like and mixed with each other. Thereafter, oxalic acid, ammonia and the like can be added thereto so as to coprecipitate the same as a mixed oxalate or hydroxide of these rare earth elements, and then the coprecipitated product can be fired to be pyrolized into oxides. Then, the oxides and the remaining other raw materials can be homogeneously mixed with each other, and thereafter can be finally fired. On the other hand, as a flux which is used as a phosphor raw material, a carbonate or phosphate of an alkaline metal such as $Na_2CO_3$ and $K_3PO_4$ is used, whose additive amount is preferably in the range of 20–50% by weight of raw materials for rare earth oxides. On the other hand, sulfur (S) which is used as a phosphor raw material is preferably used in a larger amount than the stoichiometrical amount as mentioned above, because sulfur is used in order to protect each of the phosphor raw materials for rare earth oxides from oxidation and furthermore in order to change a firing atmosphere into a sulfurizing property.

The concentration (namely, the value of "x") of an activator (Pr) for the rare earth oxysulfide phosphor is preferably in the range of $10^{-4} \leq x \leq 2 \times 10^{-1}$ from the point of view of emission luminance, more preferably in the range of $5 \times 10^{-4} \leq x \leq 10^{-2}$. On the other hand, if the content (namely, the value of "y") of Sc, an additive element included in order to decrease the afterglow is smaller than $10^{-4}$ the effect of decreasing the afterglow is scarcely provided. Therefore, the amount smaller than $10^{-4}$ is not preferred. On the other hand, if the content is larger than $10^{-1}$, although the afterglow is decreased, the emission luminance is remarkably decreased. Therefore, an amount larger than $10^{-1}$ is not practically preferred. Accordingly, the content (namely, the value of "y") of Sc is preferably in the range of $10^{-4} \leq y \leq 10^{-1}$, and more preferably in the range of $10^{-3} \leq y \leq 2 \times 10^{-2}$.

Besides, in order to further decrease an afterglow, Ce may be added to the phosphor in a particular amount, which (namely, the value of "z") is preferably in the range of $0 \leq z \leq 10^{-6}$. If the value of "z" is larger than $10^{-6}$, a body color occurs in the resulting phosphor, which decreases the emission luminance of the phosphor.

Figure 2:
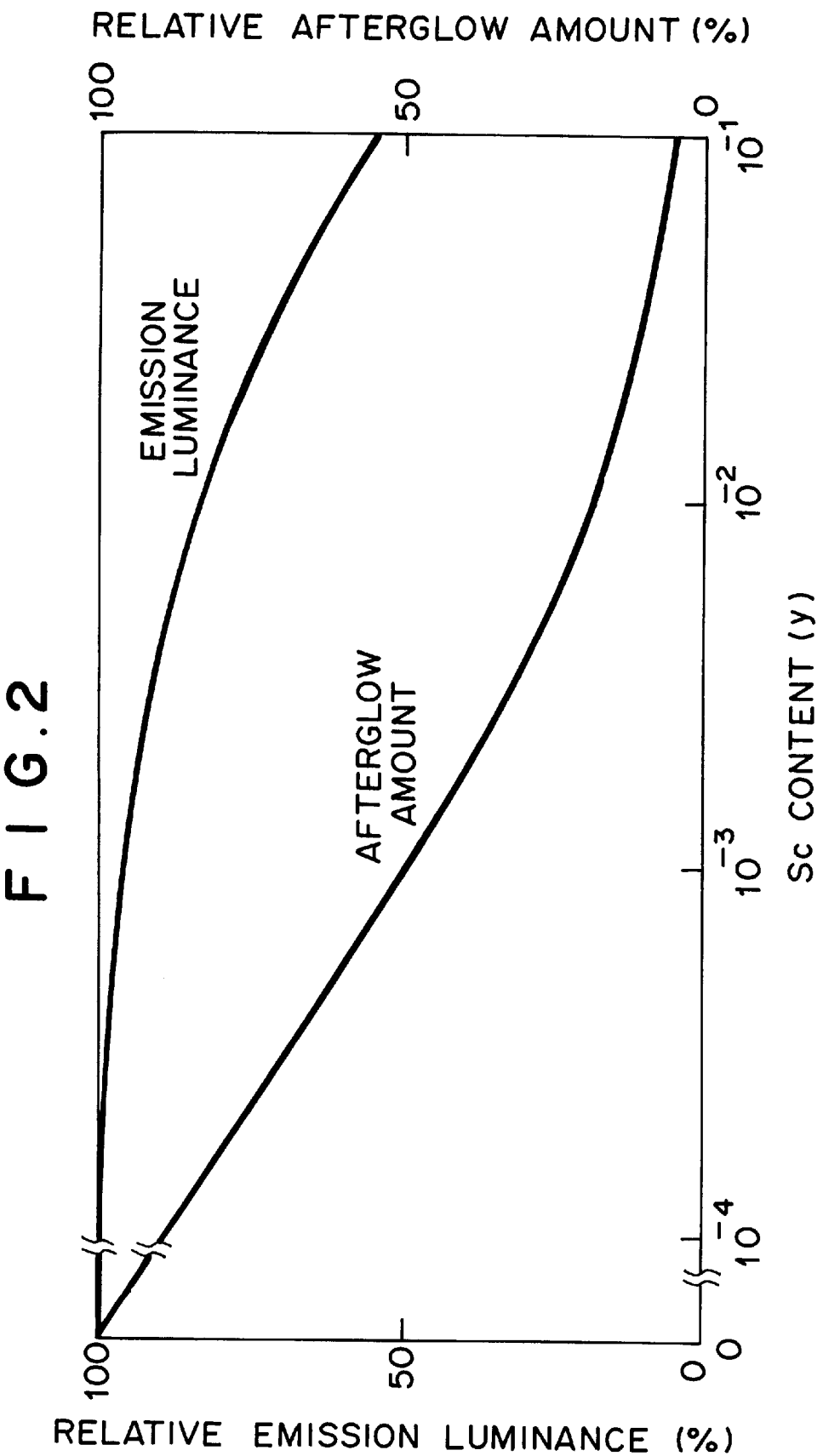
FIG. 2 is a graph showing the relation between the content of an additive (Sc) in a rare earth oxysulfide phosphor of Working Example 7 of the present invention and the emission luminance under an X-ray excitation of the phosphor and the amount of afterglow thereof.

FIG. 2 is a graph showing the correlation between the content (the value of "y") of Sc and the emission luminance of the resultant phosphor or the amount of afterglow thereof in connection with $(Gd_{1-x-y}Pr_xSc_y)_2O_2S$ phosphor in which the concentration (namely, the value of "x") of Pr as an activator is constant (0.001), the phosphor being an example of the rare earth oxysulfide phosphor of the present invention. In the FIG. 2, the emission luminance is an instantaneous emission luminance which was obtained by determining the photographic density of an X-ray film after developed after each of the phosphors was brought into contact with the X-ray film and was exposed to X-rays having a tube voltage of 100 kV at a dark place, while the amount of afterglow is an accumulated amount of afterglow, which was obtained from a photographic density after developing an X-ray film when each of the phosphors was separately kept in a dark place and was exposed to X-rays, and after the interval of one second from turning off the X-ray the phosphors was brought into contact with the X-ray film, and then the X-ray film was left as it was at a dark place for a period of thirty minutes. Incidentally, each of the measurements of each sample is represented as a relative value when an instantaneous emission luminance and the amount of afterglow which were determined from a phosphor which does not include an additive agent (Sc) were considered as 100, and the values of an emission luminance and the amount of afterglow which are hereinafter shown in each of the working examples also were determined in the same manner.

As can be seen from FIG. 2, when the content (the value of "y") of an additive agent (Sc) is increased, the afterglow of phosphor is decreased, while the emission luminance also is decreased. Thus, the increase of the content of Sc is not preferred. On the contrary, when the content of Sc is too small, the effect of decreasing the afterglow is not provided. Accordingly, when the content (the value of "y") of an additive agent (Sc) is in the range of $10^{-4} \leq y \leq 2 \times 10^{-2}$, the afterglow is practically decreased while the decrease of the emission luminance is not so remarkable.

Each of rare earth oxysulfide phosphors having the composition formula (I) and formula (II) which were obtained in the manner as mentioned above is dispersed in an insoluble solvent and a binder so as to prepare a phosphor coating slurry which is applied onto a certain support to form a fluorescent screen. Alternatively, the resultant phosphor is pressed and formed into a desired size by means of a molding machine, and then again fired and sintered. The resultant fluorescent screen or sintered body is employed as a means for emitting fluorescence, which emits an instantaneous fluorescence when the fluorescent screen or sintered body has absorbed radiation. The fluorescent screen or sintered body is combined with a photodetector comprising a photoelectric conversion device as usually used, such as a photomultiphlier and photodiode which can detect fluorescence from the means for emitting fluorescence and can convert a light output into an electric signal, thus, an X-ray detector of the present invention being provided.

WORKING EXAMPLES

Then, the present invention will be explained with working examples.

[Working Example 1 and Comparative Example 1]

| | |
|---|---|
| Gadolinium Oxide ($Gd_2O_3$) | 200 gr.; |
| Praseodymium Oxide ($Pr_6O_{11}$) | 0.2 gr.; and |
| Niobium Oxide ($Nb_2O_5$) | 28 mg | were previously homogeneously mixed with each other, and then this mixture was homogeneously blended with:

| | |
|---|---|
| Sodium Carbonate ($Na_2CO_3$) | 80 gr.; |
| Sulfur (S) | 60 gr.; and |
| Potassium Dihydrogenphosphate ($KH_2PO_4$) | 20 gr. |

Then, the blend was filled in an alumina crucible and fired in the air at a temperature of 1150° C. for a period of five hours. The resultant fired product is sufficiently washed with a pure water, dried, and thereafter sieved so as to disperse the particles of phosphor, and thereby a phosphor of Working Example 1 was provided, which has the composition formula:

$Gd_2O_2S:0.001Pr, yNb$ wherein the value (x, y, z) of each of the elements is represented by the unit of gram atom, as well as the one in each of the following working examples and comparative examples. The content "y" of Nb in this phosphor was 20 ppm according to a chemical analysis.

On the other hand, for comparison, a phosphor of $Gd_2O_2S:0.001Pr$ of Comparative Example 1 was obtained, which was prepared in the same manner as shown in Working Example 1 as mentioned above, except that niobium oxide ($Nb_2O_5$) was not used as a phosphor raw material compound.

The composition of each of the phosphors of Working Example 1 and Comparative Example 1, as obtained in the above-mentioned manner; and a particle size, an emission luminance and an amount of afterglow measured about each of the phosphors are shown in Table 1. Methods of measuring the emission luminance and the amount of afterglow about each of the phosphors are the same as the measuring methods explained about FIG. 1.

[Working Examples 2–6 and Comparative Examples 2–6]

A phosphor having a composition of each of Working Examples 2–6 as shown in Table 1 was prepared in the same manner as that of the phosphor of Working Example 1.

Furthermore, for comparison, a phosphor having a composition of each of Comparative Examples 2–6 as shown in Table 1 was prepared in the same manner as that of the phosphor of Comparative Example 1.

A particle size, an emission luminance and an amount of afterglow as measured about each of the phosphors of working Examples 2–6 and Comparative Examples 2–6 as obtained in the above-mentioned manner are shown in Table 1. Though the relative values of the measured values of the emission luminances and amount of afterglow of the phosphors as shown in Table 1 can be relatively compared between each pair of the working example and its comparative example, but an absolute comparison among the examples can not be made.

As is apparent from Table 1, the rare earth oxysulfide phosphors of the present invention, in which the element "M" are included, are smaller in afterglow, are less in the decrease of emission luminance, and emit at higher efficiency, as compared with the conventional rare earth oxysulfide phosphors not including element "M"Furthermore, an X-ray detector in which the phosphor of the present invention was used as a radiation to light converting material was excellent in S/N ratios.

TABLE 1

| Working Examples Comparative Examples | Composition of Phosphor | M & Content of M (ppm) | Particle Size ($\mu$m) | Emission Luminance (Relative Value) | Amount of Afterglow (Relative value) |
|---|---|---|---|---|---|
| Working Example 1 | $Gd_2O_2S:0.001Pr, Nb$ | Nb(20) | 6.1 | 94 | 15 |
| Comparative Example 1 | $Gd_2O_2S:0.001Pr$ | — | 5.7 | 100 | 100 |
| Working Example 2 | $Gd_2O_2S:0.001Pr, Ta$ | Ta(5) | 5.9 | 97 | 23 |
| Comparative Example 2 | $Gd_2O_2S:0.001Pr$ | — | 5.7 | 100 | 100 |
| Working Example 3 | $G_2O_2S:0.001Pr, Mn$ | Mn(1) | 5.6 | 95 | 11 |
| Comparative Example 3 | $Gd_2O_2S:0.001Pr$ | — | 5.7 | 100 | 100 |
| Working Example 4 | $Gd_2O_2S:0.001Tb, Nb$ | Nb(20) | 5.5 | 96 | 0 |
| Comparative Example 4 | $Gd_2O_2S:0.001Tb$ | — | 5.5 | 100 | 100 |
| Working Example 5 | $Y_2O_2S:0.001Pr, Nb, Ta$ | Nb(4) Ta(5) | 5.5 | 98 | 36 |
| Comparative Example 5 | $Y_2O_2S:0.001Pr$ | — | 5.5 | 100 | 100 |
| Working Example 6 | $La_2O_2S:0.001Pr, Ce, Ta$ | Ce(0.3) Ta(1) | 5.6 | 94 | 10 |
| Comparative Example 6 | $La_2O_2S:0.001Pr$ | — | 5.5 | 100 | 100 |

[Working Example 7 and Comparative Example 7]

| | |
|---|---|
| Gadolinium Oxide ($Gd_2O_3$) | 199.661 gr. |
| Praseodymium Oxide ($Pr_6O_{11}$) | 186 mg; and |
| Scandium Oxide ($Sc_2O_3$) | 153 mg | were previously homogeneously mixed with each other, and then this mixture was homogeneously blended with:

| | |
|---|---|
| Sodium Carbonate (Na$_2$CO$_3$) | 80 gr.; |
| Sulfur (S) | 60 gr.; |
| Potassium Dihydrogenphosphate (KH$_2$PO$_4$) | 20 gr.. |

Then, the blend was filled in an alumina crucible, then fired in the air at a temperature of 1150° C. for a period of five hours. The resultant fired product was sufficiently washed with a pure water, dried, and thereafter sieved so as to disperse the particles of phosphor, and thereby a phosphor of Working Example 7, which has the composition formula:

(Gd0.997,Pr0.001,Sc0.002)$_2$O$_2$S was provided

On the other hand, for comparison, a phosphor of (Gd0.999, Pr0.001)$_2$O$_2$S phosphor of Comparative Example 7 was obtained, which was prepared in the same manner as shown in Working Example 7 as mentioned above, except that scandium oxide (Sc$_2$O$_3$) was not used as a phosphor raw material compound.

A composition of each of the phosphors of Working Example 7 and Comparative Example 7 obtained in the above-mentioned manner, a particle size, an emission luminance and an amount of afterglow measured about each of the phosphors are shown in Table 2. Methods of measuring the emission luminance and amount of afterglow about each of the phosphors are the same as the above-mentioned measuring methods as explained about FIG. 2. [Working Example 8 and Comparative Example 8]

| | |
|---|---|
| Gadolinium Oxide (Gd$_2$O$_3$) | 199.661 gr.; |
| Praseodymium Oxide (Pr$_6$O$_{11}$) | 186 mg; |
| Scandium Oxide (Sc$_2$O$_3$) | 153 mg; and |
| Cerium Nitrate [Ce(NO$_3$)$_3$ . 6H$_2$O] | 0.13 mg | were previously homogeneously mixed with each other, and then this mixture was homogeneously blended with:

| | |
|---|---|
| Sodium Carbonate (Na$_2$Co$_3$) | 80 gr.; |
| Sulfur (S) | 60 gr.; and |
| Potassium Dihydrogenphosphate (KH$_2$PO$_4$) | 20 gr.. |

Then, an alumina crucible was filled with the blend which was then fired in the air at a temperature of 1150° C. for a period of five hours. The resultant fired product was sufficiently washed with a pure water, dried, and thereafter sieved so as to break the particles of phosphor, and thereby a phosphor of Working Example 8 was provided, which has the composition formula:

(Gd0.9969997, Pr0.001, Sc0.002, Ce0.0000003)$_2$O$_2$S.

Incidentally, with respect to the above-mentioned cerium nitrate, first, cerium nitrate only was previously dissolved in pure water so as to prepare an aqueous cerium nitrate solution having a concentration of 1 mg/liter as converted into Ce, and then 42 ml of this solution was added to the other raw material oxides, mixed with each other, dried, and thereafter fired.

On the other hand, for comparison, a phosphor of (Gd0.9989997, Pr0.001, Ce0.0000003)$_2$O$_2$S phosphor of Comparative Example 8 was obtained, which was prepared in the same manner as shown in Working Example 8 as mentioned above, except that scandium oxide (Sc$_2$O$_3$) was not used as a phosphor raw material compound With respect to each of the phosphors of Working Example 8 and Comparative Example 8 obtained in the above-mentioned manner, a particle size, an emission luminance and an amount of afterglow thereof as measured are shown in Table 2.

As is apparent from Table 2, as compared with the conventional rare earth oxysulfides not containing element "Sc", rare earth oxysulfide phosphors of the present invention, in which the element "Sc" is included, are smaller in afterglow, are less in the decrease of emission luminance, and emit at higher efficiency. Furthermore, an X-ray detector in which the phosphor of the present invention was used as a radiation to light converting material was excellent in an S/N ratio.

TABLE 2

| Working Examples Comparative Examples | Composition of Phosphor | Content of Sc (Value of "y") | Particle Size ($\mu$m) | Emission Luminance (Relative Value) | Amount of Afterglow (Relative Value) |
|---|---|---|---|---|---|
| Working Example 7 | (GdPrSc)$_2$O$_2$S | 0.002 | 5.4 | 92 | 39 |
| Comparative Example 7 | (GdPr)$_2$O$_2$S | — | 5.7 | 100 | 100 |
| Working Example 8 | (GdPrScCe)$_2$O$_2$S | 0.002 | 5.4 | 89 | 7 |
| Comparative Example 8 | (GdPrCe)$_2$O$_2$S | — | 5.6 | 100 | 100 |

Effects of the Invention

With respect to the rare earth oxysulfide phosphor of the present invention, the afterglow thereof is remarkably decreased as compared with that of the conventional rare earth oxysulfide phosphor, and furthermore a decrease of emission luminance is lowered, and high efficient luminescence is exhibited. Furthermore, a high efficient X-ray detector in which the afterglow is decreased and an S/N ratio is large is provided by using the phosphor of the present invention.

Industrial Applicability

When the rare earth oxysulfide phosphor of the present invention is excited by radiation such as X-rays or gamma rays, a scintillation is emitted with high efficiency, and the afterglow is decreased. Therefore, an X-ray detector in which the phosphor is used as a scintillator is excellent in an S/N ratio, and is useful in particular for an X-ray CT apparatus.

What is claimed is:

1. A rare earth oxysulfide phosphor represented by the following composition formula (I):

$$Ln_2O_2S:xRe,yM \qquad (I)$$

wherein Ln represents at least one rare earth element selected from La and Gd; Re represents at least one rare earth element selected from Pr and Tb; M represents at least one element selected from Nb, Ta and Mn; and x and y are numbers which satisfy the conditions of $1 \times 10^{-4} \leq x \leq 0.2$ and 0.01 ppm $\leq y \leq 1000$ ppm, respectively.

2. The rare earth oxysulfide phosphor according to claim 1, wherein said Ln is Gd, and said Re is Pr.

3. The rare earth oxysulfide phosphor according to claim 1, wherein the values of said x and y are numbers which satisfy the conditions of $5 \times 10^{-4} \leq x \leq 2 \times 10^{-2}$ and $0.1 \text{ ppm} \leq y \leq 200 \text{ ppm}$, respectively.

4. A rare earth oxysulfide phosphor represented by the following composition formula (II):

$$(Gd_{1-x-y-z}, Pr_x, Sc_y, Ce_z)_2 O_2 S \qquad (II)$$

wherein x, y and z are numbers which satisfy the condition of $10^{-4} \leq x \leq 2 \times 10^{-1}$, $10^{-4} \leq y \leq 10^{-1}$ and $0 < z \leq 10^{-6}$, respectively.

5. The rare earth oxysulfide phosphor according to claim 4, wherein the value of said y satisfies the condition of $10^{-3} \leq y \leq 2 \times 10^{-2}$.

6. An X-ray detector, in which the rare earth oxysulfide phosphor defined by the claim 1 is used as a scintillator.

7. The X-ray detector, in which the rare earth oxysulfide phosphor defined by said claim 4 is used as a scintillator.

* * * * *